April 14, 1959 W. L. HAADE 2,881,643
PIPE CUTTER

Filed Nov. 21, 1955 2 Sheets-Sheet 1

WILLIAM L. HAADE
INVENTOR.

BY *Lyon & Lyon*

ATTORNEYS

WILLIAM L. HAADE
INVENTOR.

United States Patent Office 2,881,643
Patented Apr. 14, 1959

2,881,643

PIPE CUTTER

William L. Haade, North Hollywood, Calif.

Application November 21, 1955, Serial No. 548,118

1 Claim. (Cl. 77—42)

This invention relates to an improved pipe cutting device.

It is the usual practice in tapping a branch pipe off a main pipe to weld the branch pipe at the desired point then to cut away the coupon or portion of the main pipe within the union. Such a practice presents numerous problems of holding the coupon during cutting, preventing same from falling into the main pipe and preventing the shavings from dropping into the main pipe.

It is an object of this invention to provide a device for cutting away the coupon at a pipe union.

It is still a further object of this invention to provide means for holding the coupon during cutting thereof.

It is still a further object of this invention to provide means for drilling through the coupon to permit holding thereof during cutting of the coupon.

It is still a further object of this invention to prevent walking of the drill during the above mentioned drilling operation.

Still a further object of this invention resides in providing means for preventing shavings from falling into the main pipe during the cutting and drilling operations.

Still other objects and advantages will be readily apparent from the following description, reference being made to the accompanying drawings, wherein.

Figure 1:
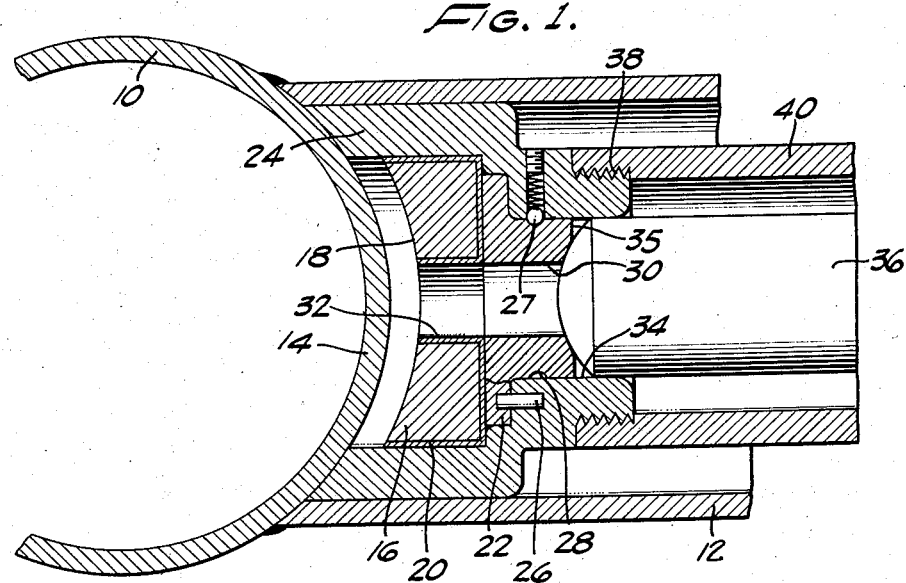
Figure 1 is a side elevation in section illustrating the positioning of the magnet means.

Referring first to Figure 1, the main iron pipe 10 has welded or otherwise fixed thereon a branch iron pipe 12 at the appropriate place where the union is to be made. It is then necessary to remove coupon 14 to complete the tapping. A circular magnet 16 is provided having its inner face 18 contoured to fit the outer surface of main pipe 10. The magnet has a cover 20 surrounding all but inner face 18 to which is attached a collar 22 by welding or otherwise.

The collar 22 fits within a template 24. A pin 26 on the template enters a suitable hole in collar 22 preventing relative rotation therebetween. The template carries spring detents 27 entering circular groove 28 in collar 22 whereby the collar and hence the magnet 16 are carried with template 24 yet removable therefrom.

The collar 22 has a central bore 30 aligned with bore 32 of magnet 16 and bore 34 of template 24. The bore 30 is smaller than bore 34 providing a shoulder 35 which is engaged by pushing bar 36 for a purpose hereinafter described.

The outer periphery of template 24 engages the inner surface of pipe 12 to centralize magnet 16. The template 24 is threaded as at 38 to fit onto hollow rod 40.

In operation the rod 40 carrying template 24 and magnet 16 are inserted into pipe 12 until the forward edge of the template engages main pipe 10. The pushing bar 36 is then urged into contact with shoulder 35 unseating spring detents 27 and pushing the magnet 16 and collar 22 forward until the magnet engages the main pipe 10. The hollow rod 40 along with template 24 and pushing bar 36 are then removed.

Figure 2:
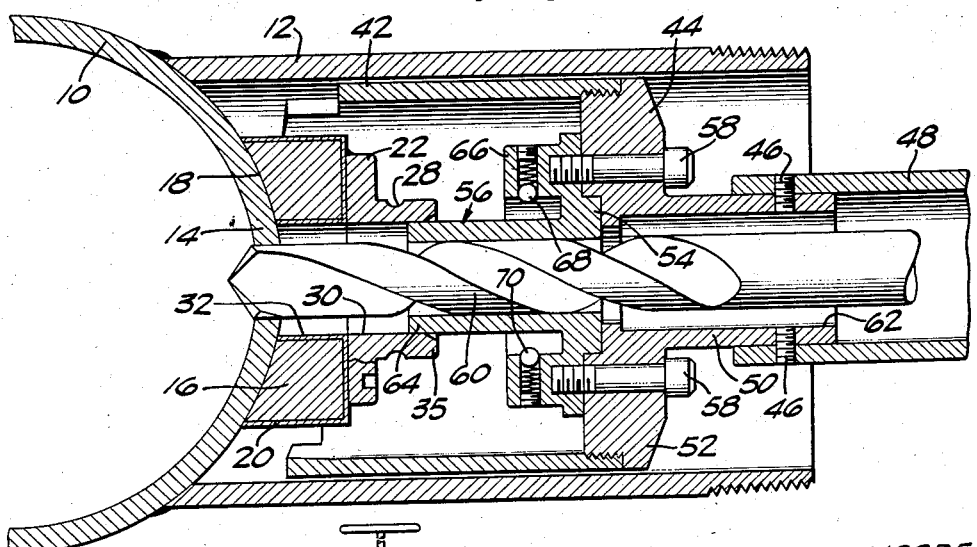
Figure 2 is a view similar to Figure 1 illustrating the coupon drilling.
Figure 5:
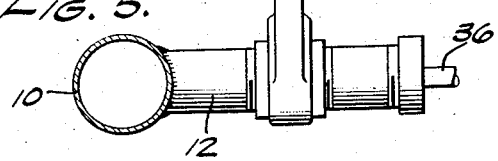
Figure 5 is a side elevation of a union.
Figure 3:
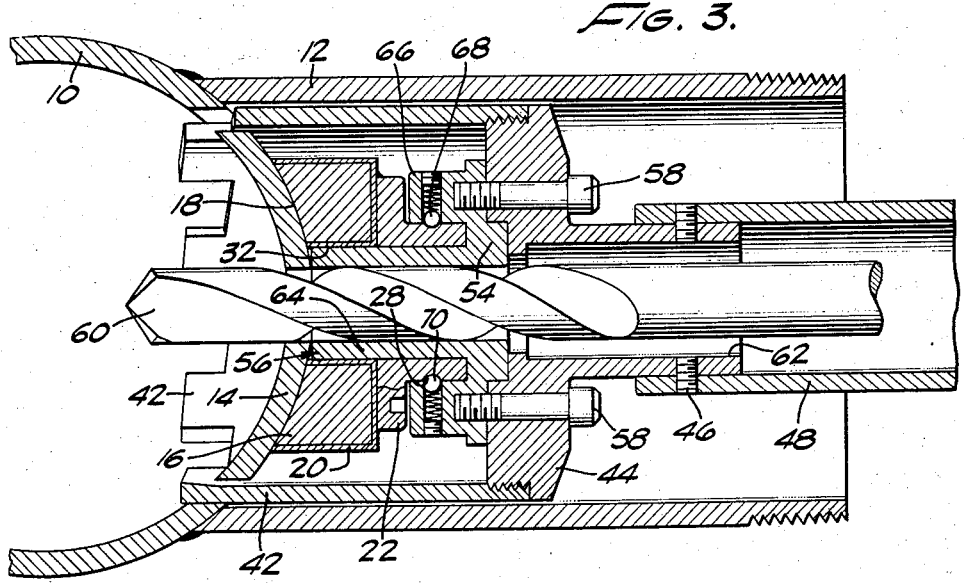
Figure 3 is a view similar to Figure 1 illustrating the coupon cutting.

Referring now to Figures 2 and 3, after the above have been removed with the magnet 16 left inside pipe 12 the drilling and cutting tools are inserted. The coupon cutting tool 42 is adjacent to the inner periphery of pipe 12 and is threaded to screw onto bushing 44 which in turn is fixed by screws 46 upon a hollow shaft 48 which is rotated from a suitable source outside the end of pipe 12. The bushing has a hollow tubular section 50 and an outwardly extending threaded flange 52 to receive the cutting tool 42. The flange 52 has a recess adapted to receive the rear extremity 54 of the drill bit guide 56 and a pair of bolts 58 secure the bushing 44 and guide 56 together. A drill bit 60 rotated from a source external to pipe 12 projects through a suitable bore 62 in bushing 44 and through guide 56 and through bore 22 contacting the surface of main pipe 10. As the drill bit is advanced it drills through pipe 10 permitting the drilling guide 56 and cutting tool 42 to advance. The central portion 64 of the drilling guide is telescopically received within bore 32 of magnet 16.

Referring now specifically to Figure 3, the drilling guide 56 also has a forwardly projecting flange 66, spaced from central section 64 a distance sufficient to receive the rear extremity of collar 22. The flange 66 also carries a pair of spring detents 68 and 70 which engage circular groove 28 locking the collar 22 to the drill guide 56. Prior to this engagement the cutting tool 42 has been cutting out coupon 14. After the coupon is cut free the shaft 48 and drill bit 60 are withdrawn carrying with them coupon 14, magnet 16 and the shavings which have been held by magnet 16.

Figure 4:
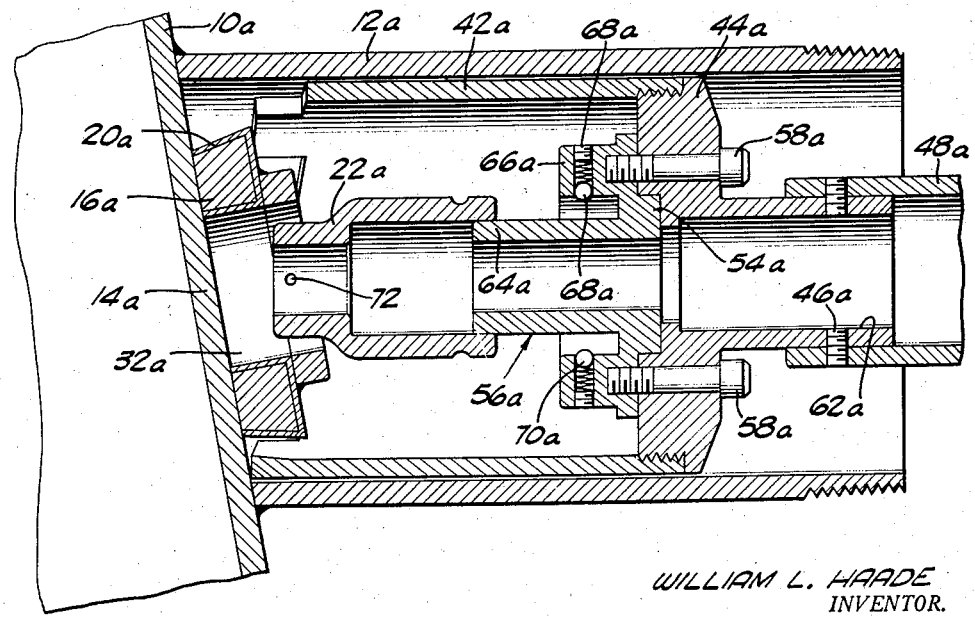
Figure 4 is a view similar to the previous views of a modification of this invention.

Referring now to Figure 4 a modification is illustrated wherein like parts having like functions are given the same numerical designations as in the principal embodiment with the addition of the exponent "a". It is readily apparent that the difference between the modification and the principal embodiment lies in inclining the axis of magnet 16a with respect to that of collar 22a and in increasing the size of bore 32a. This permits cutting out the coupon where pipe 12a is attached off center for the same reason. The magnet 16a may be pivotally attached to collar 32a by means of a pin 72.

While what hereinbefore has been described is the preferred embodiment of this invention, it is readily apparent that alterations and modifications can be resorted to without departing from hte scope of this invention and such alterations are intended to be included within the scope of the appended claim.

I claim:

In a device for cutting the coupon in a union between two iron pipes, the combination of: a magnet containing member having a central bore therethrough and a coupon contacting surface, said surface conforming to the surface of the coupon; a collar carried by said member concentric with said bore; a coupon cutting assembly including a cutting member and a cutting member supporting element; guide means carried by said supporting element, said guide means telescopically engaging said bore whereby said coupon cutting member is spaced with respect to said magnet containing member; a flange carried by said supporting member and cooperating with said guide means to form an annular opening therebetween, said collar upon relative movement of said assembly being telescopically received by said opening; and means carried by said flange and said collar for releasably engaging said assembly and said magnet containing member when said assembly and said latter member are in a predetermined spaced relationship.

References Cited in the file of this patent

UNITED STATES PATENTS

| | | |
|---|---|---|
| 438,740 | Eley | Oct. 21, 1890 |
| 2,548,314 | Kinney | Apr. 10, 1951 |

FOREIGN PATENTS

| | | |
|---|---|---|
| 887,594 | Germany | Aug. 24, 1953 |